United States Patent [19]

Bechthold et al.

[11] 4,355,013

[45] Oct. 19, 1982

[54] PROCESS FOR REMOVING SULPHURIC ACID COMPONENTS FROM FLUE GASES

[75] Inventors: Horst Bechthold, Erftstadt-Friesheim; Ulrich Mohn, Bergisch-Gladbach, both of Fed. Rep. of Germany

[73] Assignee: Maschinenfabrik Buckau R.Wolf AG, Grevenbroich, Fed. Rep. of Germany

[21] Appl. No.: 120,074

[22] Filed: Feb. 7, 1980

[30] Foreign Application Priority Data

Feb. 15, 1979 [DE] Fed. Rep. of Germany ....... 2905719
Jul. 14, 1979 [DE] Fed. Rep. of Germany ....... 2928526

[51] Int. Cl.³ ............................................. C01B 17/00
[52] U.S. Cl. ..................................................... 423/242
[58] Field of Search ............... 423/242 A, 242 R, 243, 423/244 A, 244 R

[56] References Cited

U.S. PATENT DOCUMENTS

| | | | |
|---|---|---|---|
| 3,785,119 | 1/1974 | McIlvaine | 423/242 |
| 4,081,513 | 3/1978 | Moss | 423/242 A |
| 4,197,278 | 4/1980 | Gehra et al. | 423/242 |
| 4,198,380 | 4/1980 | Kohl | 423/242 |

FOREIGN PATENT DOCUMENTS

| | | |
|---|---|---|
| 1961048 | 6/1971 | Fed. Rep. of Germany . |
| 2324547 | 11/1974 | Fed. Rep. of Germany . |
| 2431130 | 2/1976 | Fed. Rep. of Germany . |
| 2753902 | 3/1979 | Fed. Rep. of Germany . |
| 2726892 | 4/1979 | Fed. Rep. of Germany . |

Primary Examiner—O. R. Vertiz
Assistant Examiner—Gregory A. Heller
Attorney, Agent, or Firm—Michael J. Striker

[57] ABSTRACT

A process for removing acidic and other polluting components from flue gases exhausted from a boiler installation and passed through a preliminary air heater, then through a dust separator and desulphurization means; a partial current of the flue gases is branched off upstream of the air heater and passed through an auxiliary dust separator and a spray drier which is supplied with washing liquid from the desulphurization means, and thereupon the partial current is reunited with the main gas current downstream of the air preheater.

11 Claims, 2 Drawing Figures

PROCESS FOR REMOVING SULPHURIC ACID COMPONENTS FROM FLUE GASES

BACKGROUND OF THE INVENTION

The invention relates to a process for removing acid components or similar noxious materials from flue gases, preferably flue gases derived from coal or oil operated electric power stations where the flue gases prior to leaving the boiler apparatus are passed through an air preheater and are then subject to dust separation prior to treatment in a desulfurization apparatus.

A number of older power stations are still operating which do not have any desulfurization apparatus. The flue gases in these cases are simply passed through a dust separator before being discharged through the chimney. This kind of operation results in heavy air pollution.

In order to avoid this air pollution it has been proposed (German published and accepted application No. 27 53 902) to arrange a desulfurization apparatus prior to the dust remover and the discharged chimney. These desulfurization apparatus are known in many different forms. They are operated as wet or dry devices, see West German published application No. 27 25 892.

With these power stations which are provided with desulfurization devices, the problem is shifted from the air pollution to water and soil pollution. In a flue coal or oil operated energy process one has succeeded with substantial expense to considerably diminish both the air pollution and the soil pollution, see West German published application No. 23 24 547.

It has also become known from West German published application No. 19 61 048 to dry the flue gases in an injection evaporator which is operated with a suspension withdrawn from a then following wet washer. A useful dry end product cannot be obtained from these processes.

Industrial flue gases are apt to involve a multiplicity of noxious gaseous material, for instance HCL, HF, $SO_2$, $NO_x$, etc. As neutralizing agent all chemicals may be used normally which form solid salt materials with the noxious gas to be absorbed during a spray drying operation.

A particularly useful process for removing noxious gaseous material from flue gases has become known from the West German accepted and published application No. 24 31 130. The flue gases in this process are mixed in an injection evaporator with a salt solution which is obtained from the process itself and the mixture of flue gas and salt solution is then concentrated by evaporation. From the dry flue gases, dust particles and salt crystals are then almost completely separated as dry mixture. The glue gases with the acid components and the salt crystals which have not been separated out in the dust removal portion of the apparatus are circulated as part of an absorption fluid for absorbing the acid components and washing out and redissolving the remaining salt crystals. The evaporated water of the absorption liquid is replenished by fresh water. The salt solution is then withdrawn from this circuit and fed back into the injection evaporator.

The invention therefore has the object to provide for a process which permits the separation of noxious materials from flue gases with simple apparatus means and can be added to already existing power stations in an economical way, that is, may reduce the otherwise necessary apparatus investment.

ESSENCE OF THE INVENTION

It has been found that for evaporation of the salt solution only a relatively small heat portion is necessary. It is not necessary to use the entire available heat contents of the flue gases to carry out a spray drying of the washing solution. According to the invention a minor proportion of the flue gases is therefore removed from the boiler plant prior to the air reheater and is passed into a spray evaporator and subsequently a dust remover whereupon it is merged with the main flue gas current prior to or following a dust removal device for the main flue current or both prior to and following such device. The total current of flue gases is then passed into the desulfurization portion of the apparatus which is operated with a wash solution. The part or all of the wash solution obtained from the wash tower of the desulfurization device is then passed into the spray dryer.

The portion of flue gases withdrawn ahead of the air preheater has a high temperature and therefore only a small amount of flue gases is necessary for evaporating and concentrating the wash solution obtained from the desulfurization device. The small amount of the flue gas permits to limit the structural parts necessary for the spray dryer and the dust remover and separator. For the spray drying of the wash solution an amount of flue gas is actually sufficient which is about 2 to 15% relative to the total amount of flue gases.

If the process of the invention is used for a new power station it is therefore also possible to reduce the size of the air preheater and of any electrofilter used in the apparatus.

If the portion of flue gases passed into the spray dryer is subjected to action in a small dust separator which is prearranged to the spray dryer, a perfect dry end product can be obtained from a separator which follows the spray dryer in the direction of the gas current.

In general the invention relates to the purging of flue gases containing noxious materials where the purging process is carried out by an absorption liquid formed with a salt solution of increased concentration followed by a spray drying of the salt solution. For this kind of device it is generally proposed to divide the flue gases into two branch currents of which one branch is subjected to the spray drying and dust separation and is submerged again with the main current of flue gases ahead of the wash tower where the flue gases are subjected to the action of the absorption fluid. The greater or lesser amount of high concentrated salt solution will depend on the proportion of noxious material. This is the salt solution which is then passed into the injection evaporator. Particularly in those cases where the flue gases have only a small proportion of fly ash or other dust-like solid particles, it may be an advantage to pass only a small amount of the flue gases into the injection evaporator and to pass the larger proportion into the washing tower without passing them through the injection evaporator and the special separator. If, for instance, only 20% of the flue gases are passed into the injection evaporator and 80% pass through the main dust separator, and the two branch currents are united following the dust separator, the total apparatus necessary for the injection evaporator and dust separator can be diminished in size by about two-thirds, which of course will also substantially reduce the investment cost.

In case of a particularly high proportion of dust-like solid particles in the flue gases the two flue gas currents may also be merged again prior to the main dust separator. It is also possible in case of a medium high dust proportion in the flue gas to divide the flue gas branch which passes through the injection evaporator in a manner that one part thereof is passed back into the main gas current ahead of the main dust separator, and the other part is merged with the main gas stream following the main dust separator.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
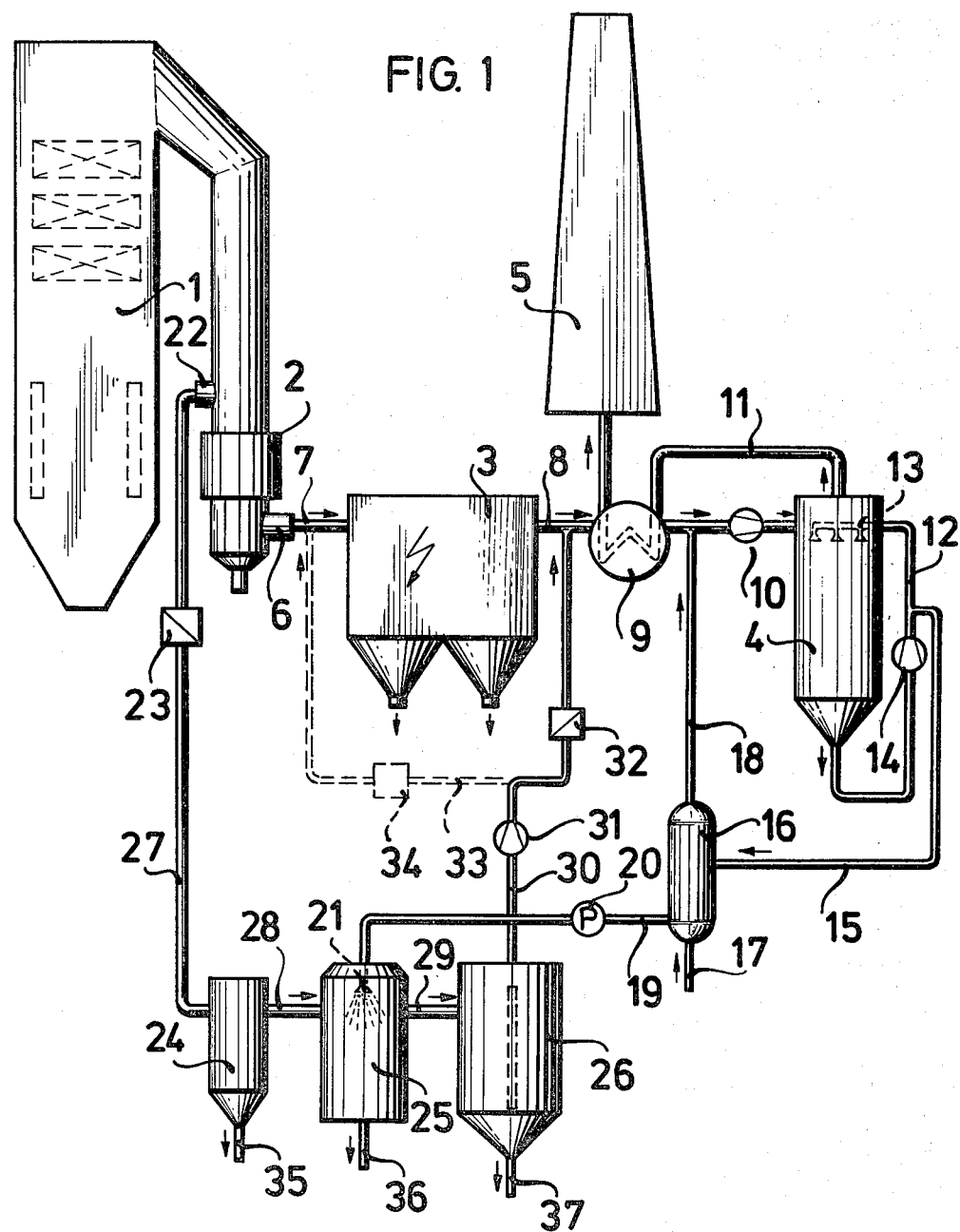
FIG. 1 shows in diagrammatic form an apparatus for purging of flue gas arranged after a boiler device.

From a boiler installation 1 which is provided with an air preheater 2 a proportion, for instance 90% of the flue gases are passed through a feed pipe 6 while 10% of the flue gases are withdrawn through the withdrawal pipe 22. The main current of the flue gases is then passed through a duct 7 into an electrofilter 3 where the dust is separated and withdrawn through discharge ducts, not further designated in the drawing. The relatively dust-free flue gases then passes through a duct 8 into the heat exchanger 9 from where they are passed into the wash tower by means of a blower 10. In the wash tower the absorption of the $SO_2$ gases is effected. The purified gases then are discharged from the wash tower through the duct 11 and passed also into the heat exchanger 9 for increasing their temperature before they are discharged through the chimney 5.

In the wash tower an absorption solution is passed through the duct 12 by means of a pump 14 into the nozzles 13. This solution is again withdrawn from the top portion of the gas tower. The solution thus is carried in a circuit through the tower. During this process the concentration of the salt solution in the absorption liquid is increased. Part of the salt solution then is passed through a feedback conduit 15 into an oxidation vessel 16. Fresh air is introduced through duct 17 into the oxidation vessel 16 while the spent air is passed through a duct 18 into the main flue gas current ahead of the blower 10.

The fed back and oxidized salt solution then is passed by means of a pump 20 through the duct 19 and into the nozzles 21 of a spray dryer 25.

The 10% of the flue gases withdrawn from the main gas current are passed into the spray dryer through a duct 27 in which a valve 23 may be provided. In order to remove dust from the flue gases withdrawn ahead of the air preheater, a special preliminary dust remover 24 may be provided from which the dust is discharged through a duct 35. The flue gases from which all or a large amount of the dust has been removed then pass through a duct 28 into the spray dryer 25. The thus formed dry flue gases which have been subjected to a preliminary dust removal are passed together with the dry salt crystals formed in the spray drier by means of a duct 29 into a separator for the spray dried salts. The salts are thus obtained as a dry final product which may, for instance, be aluminum sulfate. They are discharged through the duct 37. Any residual dust that may collect in the spray dryer should be discharged periodically through a duct 36 provided for this purpose.

The thus obtained purged gas which, according to the amount of withdrawal, is of a smaller proportion than the gas in the main current, is withdrawn from the gas salt separator 26 and is passed through a duct 30 which also is provided with a blower 31 and a valve 32 into the main gas current. Preferably, this merger with the main gas current is effected following the electrofilter 3 so that the partial gas current passes into the main current at the duct 8.

However, in an alternative proposition indicated by stippled lines in the drawing, it is also possible following the blower 31 to provide for a duct 33 which is controlled by a valve 34 in order to pass spray dried flue gases into the main gas current at the duct 7, that is, ahead of the electrofilter 3. It is in particular possible to form the duct 33 as a bypass so that by means of the valves 32 and 34 the minor proportion of the gas stream obtained from the spray dryer can pass either into the duct 8 or into the duct 7 of the main gas line. The gas may also be divided and part of it may be passed through each of these two ways of approach.

Figure 2:
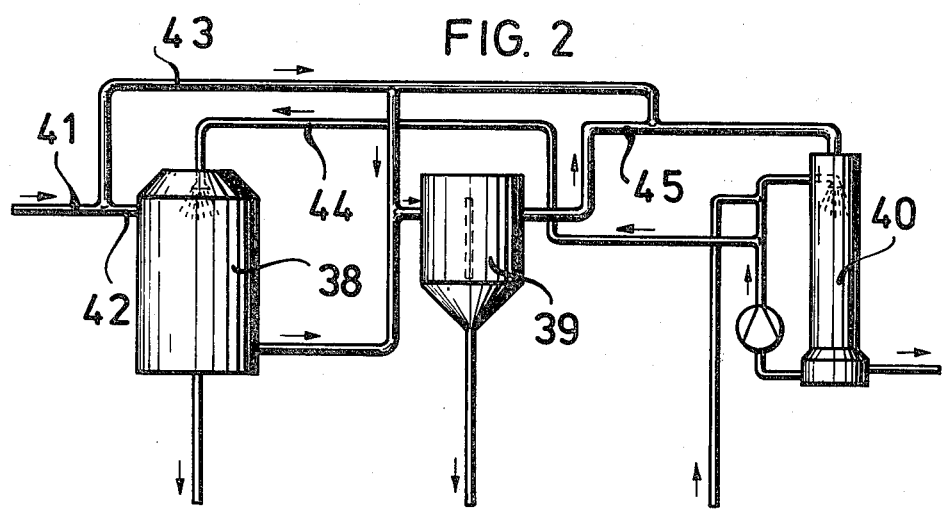
FIG. 2 illustrates in a similar manner another embodiment of the invention.

A somewhat different embodiment is shown in FIG. 2. In this embodiment 38 is the injection evaporator, 39 is a dust separator, and 40 is the wash tower. The main flue gas current obtained from a boiler or similar device in arriving through the channel 41 is divided into branch currents 42 and 43. The branch current 42 then passes into the injection evaporator. A high concentration salt solution is obtained from the wash tower 40 and is passed through a conduit 44 into this injection evaporator. Part of the thus formed salt crystals is removed directly from the spray dryer. The remaining crystals stay in the form of a dust in the gas current. The salt-dust-containing flue gas then is passed after leaving the spray dryer, either directly or after merging with the main gas current into the dust separator 39. The gases from which the dust-like particles have been removed are then passed through a duct 45 into the wash tower 40. In the duct 45 there is also added the portion of the flue gases which has not passed through the spray dryer.

As for the neutralizing agents which are used in the washing solution to form the salt crystals by reaction with the acidic components of the flue gases, they are preferably added to the washing solution together with the fresh water in dissolved form or as a suspension. They may, however, also be added in gaseous form to the gas current before the current enters the wash tower.

The acidic components of the flue gases referred to above may for instance be: HCl, HF, $SO_2$, or $NO_x$.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process for removing sulphuric polluting components from flue gases exhausted from a boiler installation and thereafter being passed through an air preheating means, dust separating means and therefrom through desulfurization means operating with a washing liquid, comprising the steps of branching the exhausted flue gases upstream of the air preheating means into a first branch conducting a main current, and a second branch conducting a smaller current passing the main current through a first dust separating means into washing means operated with an absorption liquid wherein formation of salts by reaction of neutralizing agents with the sulphuric components of the main current takes place and, simultaneously, passing the smaller current in an additional heat separator and then treating the smaller current in a spray drier operating with a washing liquid in which no reaction occurs and thereafter reuniting the treated smaller current with the main current downstream of said air preheating means and upstream of said washing means.

2. The process of claim 1, wherein the wash solution is recirculated into said wash tower and the spray dryer is operated with a concentrated salt solution formed by reaction of neutralizing agents in the wash solution with sulphuric components of the flue gases, part of the concentrated salt solution being withdrawn from the circulating wash solution and passed into the spray dryer, whereupon the dried salt crystals are recovered and the salt and dust purified gas is fed back and merged into said first branch of the flue gas current.

3. The process of claim 2, wherein the flue gas from the spray dryer is passed together with the salt crystals into a separator from which the said recovery of the salt crystals is effected and the said feedback of the gas into the first branch of the flue gas current is carried out.

4. The process of claim 2, wherein the concentrated salt solution is subjected to the action of an oxidizing agent before being passed into the spray dryer.

5. The process of claim 1, wherein the said first branch of the flue gas current is passed through a dust separator before passing into said washing tower.

6. The process of claim 5, wherein the said dust separator for the first branch of the flue gas current is an electrofilter and wherein a cyclone dust separator is provided for the second branch of the flue gas current prior to its entering the spray dryer.

7. The process of claim 5, wherein the said merger of the two flue gas currents is effected prior to or after passing of the first branch of the flue gas current through said dust separator.

8. The process of claim 5, wherein a part of said second branch of the flue gas current is merged with said first branch of the flue gas current before it enters the dust separator while a second part of the second branch of the flue gas is merged with the first branch after the flue gas of the first branch has passed through the dust separator.

9. The process of claim 1, wherein a minor portion of the total flue gases form the branch current passed into the spray dryer.

10. The process of claim 9, wherein about 2 to 15% of the total flue gases are withdrawn for said second branch current of the flue gases.

11. The process of claim 1, wherein the two branches of the flue gas current are of about equal size.

* * * * *